United States Patent
Salinas et al.

(10) Patent No.: US 9,633,054 B2
(45) Date of Patent: *Apr. 25, 2017

(54) PROVIDING A DATABASE AS A SERVICE IN A MULTI-TENANT ENVIRONMENT

(71) Applicant: Rackspace US, Inc., San Antonio, TX (US)

(72) Inventors: Daniel Salinas, San Antonio, TX (US); Michael Basnight, Austin, TX (US); Daniel Morris, Austin, TX (US); Edward Konetzko, San Antonio, TX (US)

(73) Assignee: Rackspace US, Inc., San Antonio, TX (US)

( * ) Notice: Subject to any disclaimer, the term of this patent is extended or adjusted under 35 U.S.C. 154(b) by 126 days.

This patent is subject to a terminal disclaimer.

(21) Appl. No.: 14/606,190

(22) Filed: Jan. 27, 2015

(65) Prior Publication Data

US 2015/0142856 A1 May 21, 2015

Related U.S. Application Data

(63) Continuation of application No. 13/323,069, filed on Dec. 12, 2011, now Pat. No. 8,977,735.

(51) Int. Cl.
| | |
|---|---|
| *G06F 15/173* | (2006.01) |
| *G06F 17/30* | (2006.01) |
| *G06F 9/455* | (2006.01) |
| *H04L 12/24* | (2006.01) |
| *H04L 29/06* | (2006.01) |
| *H04L 29/08* | (2006.01) |

(52) U.S. Cl.
CPC .... *G06F 17/30292* (2013.01); *G06F 9/45558* (2013.01); *G06F 17/30557* (2013.01); *G06F 2009/45562* (2013.01); *H04L 29/06* (2013.01); *H04L 29/08072* (2013.01); *H04L 41/22* (2013.01)

(58) Field of Classification Search
USPC .......................................................... 709/223
See application file for complete search history.

(56) References Cited

U.S. PATENT DOCUMENTS

| | | | |
|---|---|---|---|
| 6,611,869 B1* | 8/2003 | Eschelbeck | H04L 41/0213 707/999.009 |
| 7,171,420 B2 | 1/2007 | Iyer et al. | |
| 7,441,113 B2* | 10/2008 | Chong | G06F 9/4401 713/1 |
| 7,970,903 B2* | 6/2011 | Oeda | G06F 9/4856 709/226 |
| 8,239,552 B2 | 8/2012 | Warwick et al. | |
| 8,301,746 B2* | 10/2012 | Head | G06F 9/5077 709/203 |
| 8,422,359 B2 | 4/2013 | Nakajima | |
| 8,725,886 B1* | 5/2014 | Pulier | H04L 47/822 709/217 |

(Continued)

*Primary Examiner* — Razu A Miah
(74) *Attorney, Agent, or Firm* — Dykema Gossett P.L.L.C.

(57) ABSTRACT

In one embodiment, the present invention is directed to a system with multiple computing hosts each having a hypervisor to provide a virtual environment for the host and one or more containers each including a database instance and at least one database. These databases, and the database instance can be provided as a service to a user of a multi-tenant environment.

20 Claims, 6 Drawing Sheets

(56) References Cited

U.S. PATENT DOCUMENTS

| | | | |
|---|---|---|---|
| 8,775,590 B2* | 7/2014 | Devarakonda | H04L 43/0817 709/223 |
| 2002/0054587 A1* | 5/2002 | Baker | G06F 11/0709 370/352 |
| 2002/0075303 A1* | 6/2002 | Thompson | G06F 3/0481 715/751 |
| 2003/0233458 A1* | 12/2003 | Kwon | H04L 29/06 709/227 |
| 2005/0223048 A1 | 10/2005 | Smith et al. | |
| 2006/0053447 A1* | 3/2006 | Krzyzanowski | H04L 12/2816 725/40 |
| 2007/0198656 A1 | 8/2007 | Mazzaferri et al. | |
| 2008/0059556 A1 | 3/2008 | Greenspan et al. | |
| 2008/0127322 A1 | 5/2008 | McCall et al. | |
| 2008/0177994 A1 | 7/2008 | Mayer | |
| 2009/0077327 A1 | 3/2009 | Hara | |
| 2009/0144389 A1 | 6/2009 | Sakuta | |
| 2009/0172301 A1 | 7/2009 | Ebersole et al. | |
| 2010/0153617 A1 | 6/2010 | Miroshnichenko et al. | |
| 2010/0162264 A1 | 6/2010 | Allen et al. | |
| 2010/0205595 A1 | 8/2010 | Weissman | |
| 2010/0262794 A1* | 10/2010 | De Beer | G06F 9/45533 711/162 |
| 2010/0275241 A1 | 10/2010 | Srinivasan | |
| 2010/0306773 A1* | 12/2010 | Lee | G06F 9/5077 718/1 |
| 2011/0078213 A1* | 3/2011 | Bezar | G06Q 10/10 707/805 |
| 2011/0264861 A1 | 10/2011 | Fee et al. | |
| 2011/0265069 A1* | 10/2011 | Fee | G06F 9/5027 717/151 |
| 2011/0276963 A1* | 11/2011 | Wu | H04L 67/1097 718/1 |
| 2011/0289141 A1* | 11/2011 | Pletter | G06F 17/30575 709/203 |
| 2012/0030456 A1* | 2/2012 | Wu | H04L 67/025 713/2 |
| 2012/0036249 A1 | 2/2012 | Chandrasekaran | |
| 2012/0054306 A1 | 3/2012 | Vaghani et al. | |
| 2012/0124270 A1* | 5/2012 | Weissman | G06F 12/023 711/6 |
| 2012/0140923 A1 | 6/2012 | Lee et al. | |
| 2013/0013755 A1 | 1/2013 | Huang | |

* cited by examiner

PROVIDING A DATABASE AS A SERVICE IN A MULTI-TENANT ENVIRONMENT

This application is a continuation of U.S. patent application Ser. No. 13/323,069, filed Dec. 12, 2011, the content of which is hereby incorporated by reference.

BACKGROUND

Computer-based databases are used by almost every kind of business to handle various tasks related to data management. A typical database such as a relational database provides an ability for a user to query the database to access requested data. Oftentimes, a large business may house databases in a datacenter facility of the business.

Other database users may not have the need or resources to have such equipment, and in fact many businesses and other entities contract with a cloud-based datacenter to provide computing resources in an elastic manner. While these resources can be used for various business tasks such as web serving and so forth, in general there is not an ability to provide database services in a flexible on-demand manner.

SUMMARY OF THE INVENTION

According to one aspect, the present invention is directed to a system that has multiple computing hosts each having a hypervisor to provide a virtual environment for the host and one or more containers each including a database instance and at least one database. These databases, and the database instance can be provided as a service to a user of a multi-tenant environment. Furthermore, the container may provide for isolation such that database services for multiple users of the multi-tenant environment can be located within a single computing host. In addition, a storage area network (SAN) can be coupled to the computing hosts. The SAN can provide block level storage for databases provided as a service. More specifically, each of the databases provided as a service can be in communication with a SAN volume.

Responsive to a customer request, a scheduler can automatically identify one of the computing hosts to handle the database service for the customer. In addition, a package manager may be coupled to the computing hosts to provide a database instance to a container responsive to a request from a guest operating system (OS) within the container.

Another aspect of the present invention is directed to a method for handling database operations. Specifically, the method can include receiving a database creation request from a user in a scheduler of a cloud computing environment. This cloud environment can include computing nodes each coupled to a SAN, as described above. The scheduler can select one of the computing nodes on which to create the database. Based on this selection, a container can be spawned in the selected node, which includes a guest operating system. Then via this guest operating system, a database instance can be requested and received from a repository coupled to the node. Thereafter, the database instance can be installed in the container and the database created in the container. Such operations include associating the database with the database instance and a volume of the SAN.

A still further aspect of the present invention is directed to a system that includes various components which in some implementations can be realized via servers and storage units of a datacenter environment. The system may include a scheduler to receive a request for a database service from a remote user and to schedule the request to a compute host, where each of multiple compute hosts has a hypervisor to provide a virtual environment and multiple containers each including a database instance and at least one database. These databases can be provided as a service to users of the datacenter. In addition, the system can include a SAN coupled to the compute hosts to provide block level storage for the databases, and where each of the databases is in communication with a volume of the SAN.

The system can further include a package manager coupled to the compute nodes to receive a request to instantiate a database server in the selected compute host and an object store to store a database server image and to enable the selected compute node to instantiate the database server from the database server image responsive to control by the package manager.

Using such a system, wide scalability of databases for multiple customers of a datacenter can be realized. Embodiments can provide for automated programming of instances, including providing for replication of database instances, scaling database instances when the volume of data exceeds a threshold or so forth.

DETAILED DESCRIPTION

In various embodiments, a database as a service (DBaaS) can be provided in a multi-tenant datacenter environment. By provision of a DBaaS, users of the datacenter can perform database operations with great scalability and improved access times. As will be discussed herein, embodiments may implement such database operations using container-based virtualization in which faster access times can be realized due to the direct interaction between a database instance in the container and a physical mass storage device such as disk-based storage of a host computing platform including the container. In this way, the overhead consumed in conventional virtualization environments to interface with a virtual hard disk interposed between a guest and an underlying physical storage device can be avoided.

To provide scalability as well as to enable replication, redundancy and so forth, embodiments can further provide a storage area network (SAN) for use with the DBaaS such that the data of a given database is securely stored in the SAN. Different implementations are possible; however in one embodiment, the SAN can be a local SAN present in a rack-based server cabinet including multiple host servers and the SAN.

Figure 1:
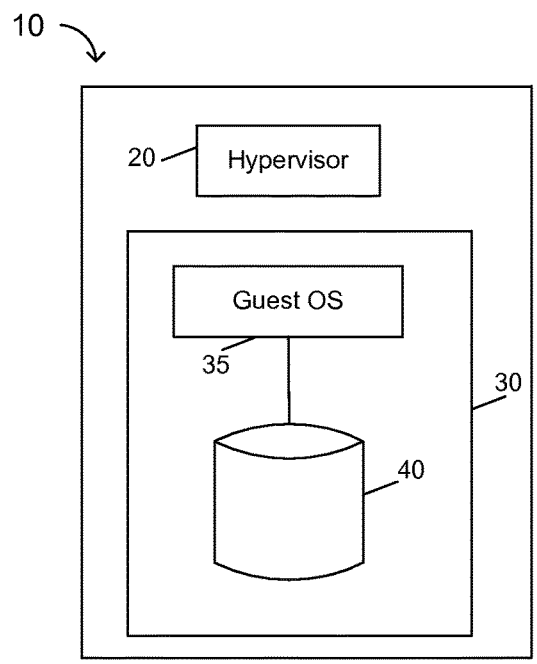
FIG. 1 is a block diagram of a high-level view of a container virtualization environment in accordance with an embodiment of the present invention.

Referring now to FIG. 1, shown is a block diagram of a high-level view of a container virtualization environment in accordance with an embodiment of the present invention. As shown in FIG. 1, a host 10 may be a physical computing host such as a server computer. As is well known to those skilled in the art, host 10 can include various hardware, including a processor, a system memory and a mass storage such as a hard drive. Of course, many different types of computing hosts exist, such as different flavors of servers which typically include additional hardware components such as network interface cards (NICs), other I/O devices, additional computing resources and so forth. Of course, the computing devices further include various firmware and/or software such as one or more operating systems and BIOS as well as potentially many different applications to be executed on the server.

As shown in the embodiment of FIG. 1, host 10 can include a hypervisor 20, which may be a layer of virtualization software that performs control and orchestration for a virtual environment of the host. In the embodiment of FIG. 1, hypervisor 20 can run at a highest privilege level and may be in communication with various components within the system. For purposes of discussion herein, a container 30 may be present. In various embodiments, container 30 can be a layer of virtualization software that enables a direct communication link with certain hardware of the system. Multiple containers can be present within a single computing host, although only one is shown for ease of illustration in FIG. 1.

In one embodiment, Linux™ containers can be used as the underlying virtualization technology, as such containers virtualize the critical pieces of hardware that databases use the most. That is, database servers rely heavily on memory, processor and hard drives to serve content to its clients. While both containers and traditional virtualization are very efficient at separating memory allocations per guest, virtualization is sub par when isolating processor and hard drive resources when compared to containers. In one embodiment, the container technology may be OpenVZ containers, which is an open source project mainly developed by Parallels Inc., Renton, Wash.

Because memory is the main resource that database services utilize the most, memory is the core measurement used to allocate a container. As an example, the processing resources on a host computer can be provisioned based on a percentage of subscribed memory. For example, if a host node was configured with 16 GB of memory and a guest container was configured with 1 GB of that memory, then it would subsequently get $1/16^{th}$ of the processing power of the host node.

Processor isolation in traditional virtualization is done through emulating a processor for the guest operating system. This emulation in and of itself incurs a large amount of overhead to maintain and scale, thus reducing the overall amount of resources that can be used to actually host guests. Conversely container virtualization in accordance with an embodiment of the present invention can offer a much simpler yet more elegant method of processor scheduling and prioritization. Computer processor power is measured in several ways but most commonly by its clock rate. This clock rate is tied to the speed in which a processor can execute a number of instructions per second. This value differs from processor to processor but is fixed for a given processor. Using OpenVZ tools, access to a "processing power" integer can be obtained that represents the units available on the host node. This integer is represented in OpenVZ terms as "cpuunits". When a guest, or container, is provisioned it is assigned a number of cpuunits either by a template configuration or by using the OpenVZ management commands. This number cannot exceed the maximum cpuunits for the host machine and represents the processing power being allocated to the container. For reference OpenVZ considers one 1 Ghz PIII processor to be equivalent to 50000 cpu units. OpenVZ also sets a limit on cpu time for each container and this is represented with the "cpulimit" setting. Lastly OpenVZ also enables control of the number of virtual cpus presented to the container using a "cpus" option. Once the total processing power of a host computer is known, an algorithm using the percentage of memory subscribed to a new guest can be used to calculate the total processing power given to that guest. For example, assume a host node has a total cpuunits rating of 800000, using the previous example of a guest node given $1/16^{th}$ of a host node's processing power, this container would have a cpuunits setting of 50000 or the processing power equivalent to one 1 Ghz PIII processor.

The hard drive resource on a given host is the largest contributor to latency in a database server. The ability to fairly schedule access to hard drives provides an ability to assure performance on a database as a service platform in accordance with an embodiment of the present invention. In one such embodiment, disk space utilization and disk IO priority can be set using management tools of OpenVZ. IO fairness and priority can be realized using a priority grouping that uses an integer between 0 and 7, with 7 being the highest priority in one embodiment. The percentage of subscribed memory can be used to calculate the group in which a container will be located. This is done by taking the maximum value and multiplying it by the percentage of allocated resource and rounding that number up to the nearest integer not to exceed 7. This priority group number is a relative number so that if all containers are subscribed such that they are all in priority group 4, each will receive equal share of IO access via the IO scheduler.

The aspect of containers that gives greater performance comes from the utilization of these schedulers rather than emulating hardware for the guests to use, referred to as time slicing or bean counting.

Within each container, a guest operating system 35 can be present. This guest OS can perform control and other supervisory functions for one or more applications to be executed within the container. For purposes of illustration herein, a representative example of such applications can be a database application. As will be discussed further, in particular embodiments a database instance can be implemented via a MySQL server. Given the container-based virtualization, container 30 can communicate directly with a mass storage 40, which in the embodiment of FIG. 1 can be a local hard drive of the host. In this way, improved access times can be realized. This is particularly beneficial for database applications, as almost all of the operations to be performed in a database environment such as writes, reads, updates and so forth are performed with a disk access. Although shown at this high level in the embodiment of FIG. 1, realize that many more components can be present in a server. For example, a container further includes a guest agent. In general, the guest agent orchestrates the commands that are sent to the database instance as well as control interactions with a package repository for managing packages installed on the system. As examples, the guest agent can perform database/user management, backups, recovery, imports, exports and replication. Furthermore understand that although a single container is shown for purposes of illustration, in a given embodiment many such containers that can be present. For example, in a rack-mounted server, approximately 40-60 containers can be present in a given host server, although embodiments are not so limited.

Figure 2:
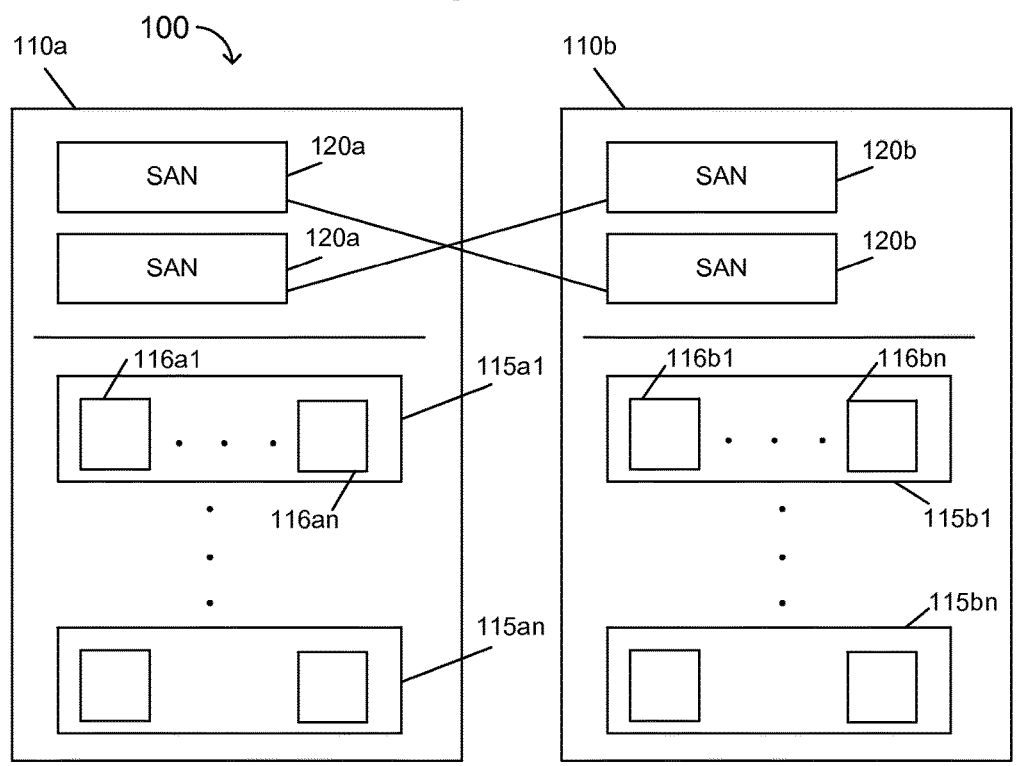
FIG. 2 is a block diagram of a portion of a datacenter environment in accordance with an embodiment of the present invention.

Referring now to FIG. 2, shown is a block diagram of a portion of a datacenter environment in accordance with an embodiment of the present invention. As shown in FIG. 2, datacenter environment 100 can include a pair of cabinets 110a and 110b. Each cabinet can include a SAN 120a and 120b and multiple hosts $115_{a1-an}$ and $115_{b1-bn}$. In typical implementations, SAN 120 can be provided as a top of rack storage area network that can provide for a large amount of storage. Of course, in other examples the SAN can be located outside of the cabinet. As an example, each SAN 120 can be a 4 TB storage formed of multiple disk drives or other mass storage devices. To provide for redundancy, error recovery and so forth, the data present in a given cabinet's SAN can be mirrored or replicated to the SAN of the other cabinet according to a given RAID protocol, e.g., a RAID10 implementation. Via this RAID implementation, fault tolerance is provided with failover redundancy to the other cabinet, along with other features of the RAID10 protocol such as synchronous block replication.

Each host 115 can be realized as a rack-mounted server that can generally be configured as discussed above with regard to FIG. 1. Each host can include multiple containers $116_{a1-an}$ and $116_{b1-bn}$, where each container can be associated with a different isolated environment. For purposes of discussion herein, it can be assumed that each container 116 includes a database instance and one or more databases that execute on this instance, in addition to a guest OS. Although the discussion herein is with regard to database instances, understand that other container-based resources such as caching services, web servers, and so forth can also be present. Note that each container can be isolated from the other containers, and as such each container can include a database instance (and multiple databases) associated with a single customer of the multi-tenant environment. Accordingly, each container is a non-shared resource of the multi-tenant environment. However, it is possible to use a large container in a multi-tenant fashion such that a single database instance can be shared, provided there are security mechanisms to handle multiple sub-accounts/customers on the instance. Note that by way of the container virtualization described herein, a container can be configured with a relatively small amount of memory such as a 512 MB slice of system memory. In this way, a large number of containers can be configured within a single host server. In contrast, for typical cloud-based server instances, the memory footprint is generally on the order of at least 2-4 GB per virtual server.

As a result, a large number of containers can be configured on a single host server. With a base container size of 512 MBs, it is possible to have a large number of isolated containers on a single host. For example, assume a given host server has a memory footprint of 36 GB; also assume some amount of memory is allocated to an OS and other overhead software, approximately 50 containers can be provided within a single host. Although described for example with this allocation, understand the scope of the present invention is not limited in this regard.

Figure 3:
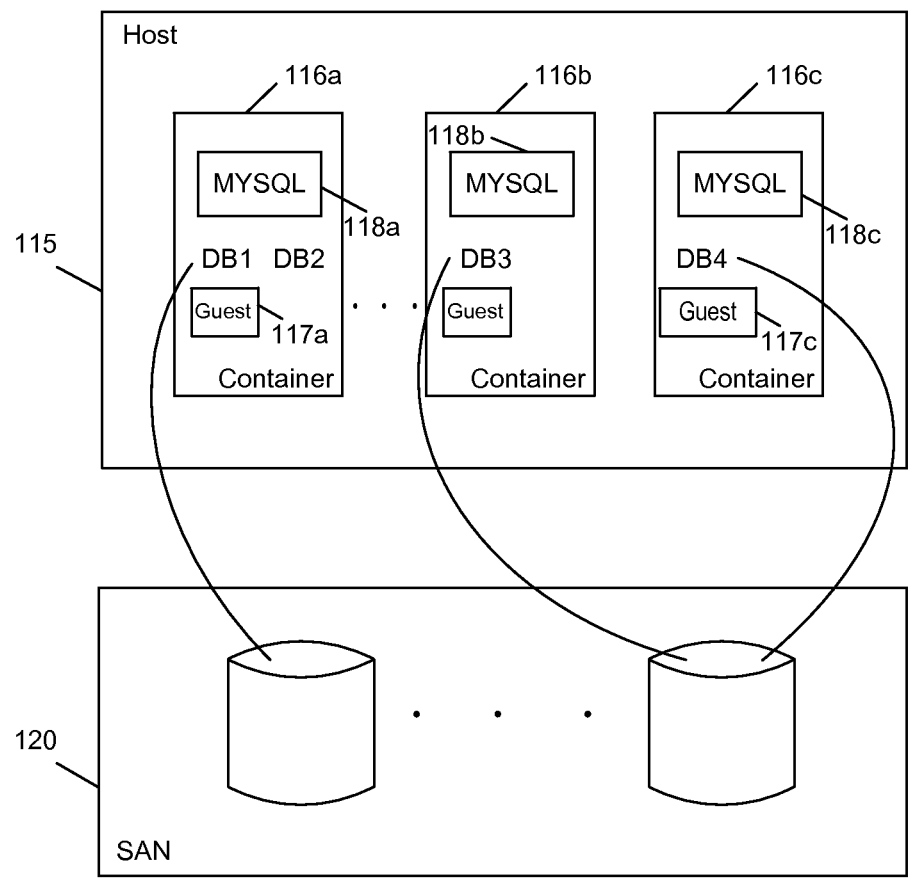
FIG. 3 is a block diagram of how communications occur between a database and a SAN in accordance with one embodiment of the present invention.

To further illustrate how communications occur between a given database and a SAN, reference can be made to FIG. 3. As shown in FIG. 3, a single host 115 is shown in communication with a SAN 120. As seen in FIG. 3, for purposes of illustration host 115 includes multiple containers 116a-116c. Each container includes a corresponding guest 117a-117c and a corresponding database instance. Specifically in the embodiment of FIG. 3, the database instances may be MySQL servers 118a-118c. Although shown in the embodiment of FIG. 3 as being MySQL servers, understand the scope of the present invention is not limited in this regard. For example, a PostgreSQL server or other database server that can be run in Linux™ may be present. Each container can further include multiple databases that are associated with the given MySQL instance. Specifically, container 116a includes a first database DB1 and a second database DB2. In turn, container 116b includes a third database DB3, and a third container 116c includes a fourth database DB4. While shown with this particular configuration in the embodiment of FIG. 3 understand that more containers may be present, and each of the containers, both illustrated in FIG. 3 and other additional containers, can include more databases as appropriate.

As seen, each database can be in communication with SAN 120. Although two physical disks are shown for illustration in FIG. 3, understand the scope of the present invention is not limited in this regard and many more physical disks can be provided. Note that each database of a database instance can be associated with a single volume of the SAN. As will be described further below, on creation of a database, this association between a database and volume of a SAN can be defined.

Figure 4:
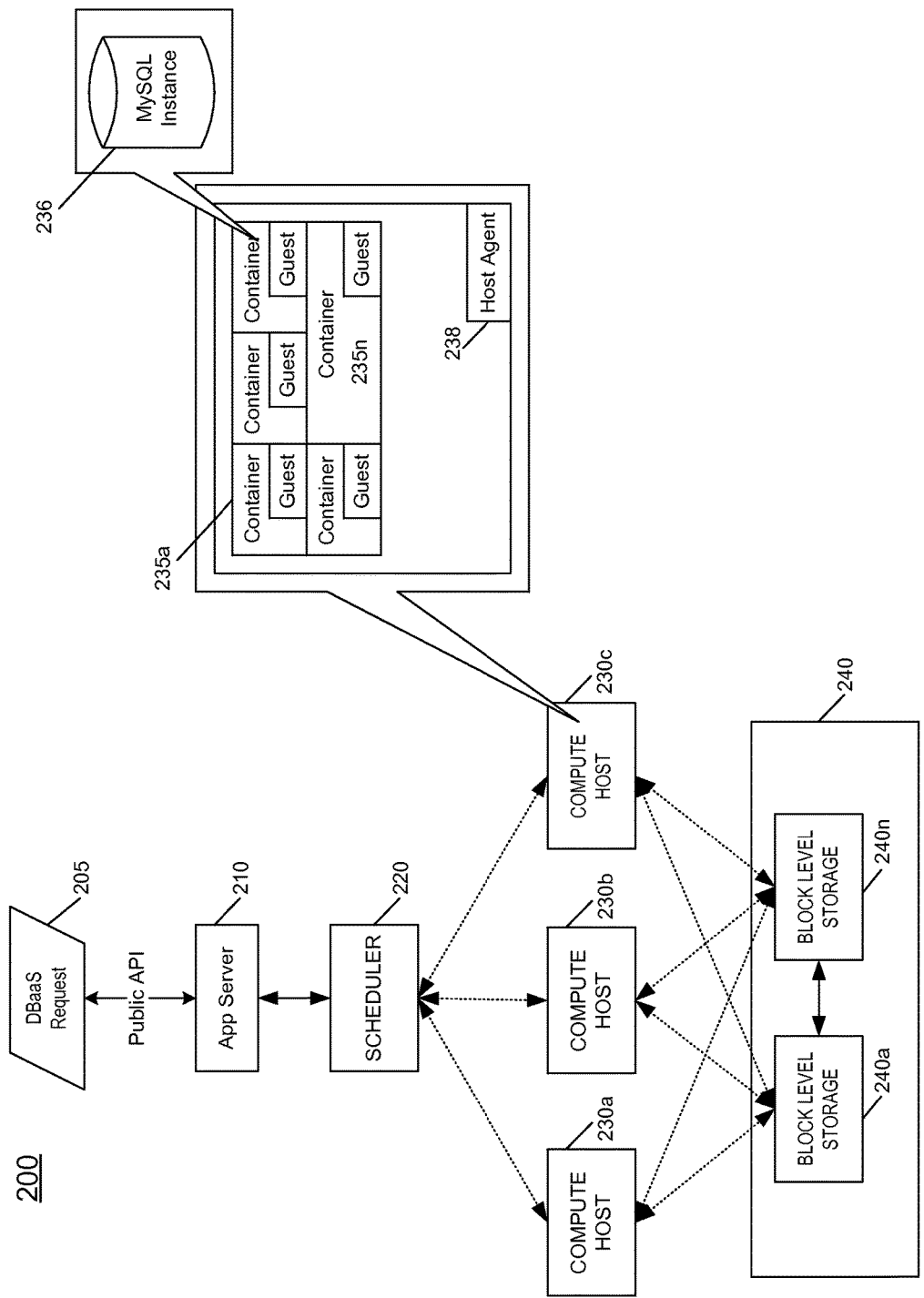
FIG. 4 is a block diagram of a high-level infrastructure that can handle incoming database requests to a multi-tenant datacenter in accordance with an embodiment of the present invention.

Referring now to FIG. 4, shown is a block diagram of a high-level infrastructure 200 that can handle incoming database requests to a multi-tenant datacenter in accordance with an embodiment of the present invention. Incoming database requests 205 from end users can be communicated, e.g., via a public application programming interface (API) to an application server 210. As an example, this application server can be a rack-mounted server configured to receive incoming requests from customers of the data center routed from a router or other gateway to a network, e.g., the Internet. In turn, application server 210 can communicate the requests to a scheduler 220. Although the scope of the present invention is not limited this regard, in some embodiments scheduler 220 can be an open source scheduler of a cloud environment of the multi-tenant environment. In turn, scheduler 220 can be in communication with multiple computing hosts 230a-230c. In general, these computing hosts can be configured as described above, and each of the computing hosts in the embodiment of FIG. 4 can be configured to include multiple containers each having a database instance associated therewith. In turn, each of the computing hosts 230 can be in communication with at least one block level storage device 240a-240n of a storage area network 240.

As further seen in FIG. 4, each computing host can include multiple containers. In the embodiment of FIG. 4, a detailed view of computing host 230c includes multiple containers 235a-235n. Each such container includes a database instance, namely a MySQL instance 236 and a number of databases (not shown for ease of illustration in FIG. 4). As further seen, each host can include a host agent 238 which may be a hypervisor or other supervisor or orchestration layer software. Although shown at this high-level in the embodiment of FIG. 4, understand that additional components can be present and further understand that additional layers of software, both of the multi-tenant environment, as well as for the DBaaS specifically, can be present in the various components shown in FIG. 4.

Figure 5:
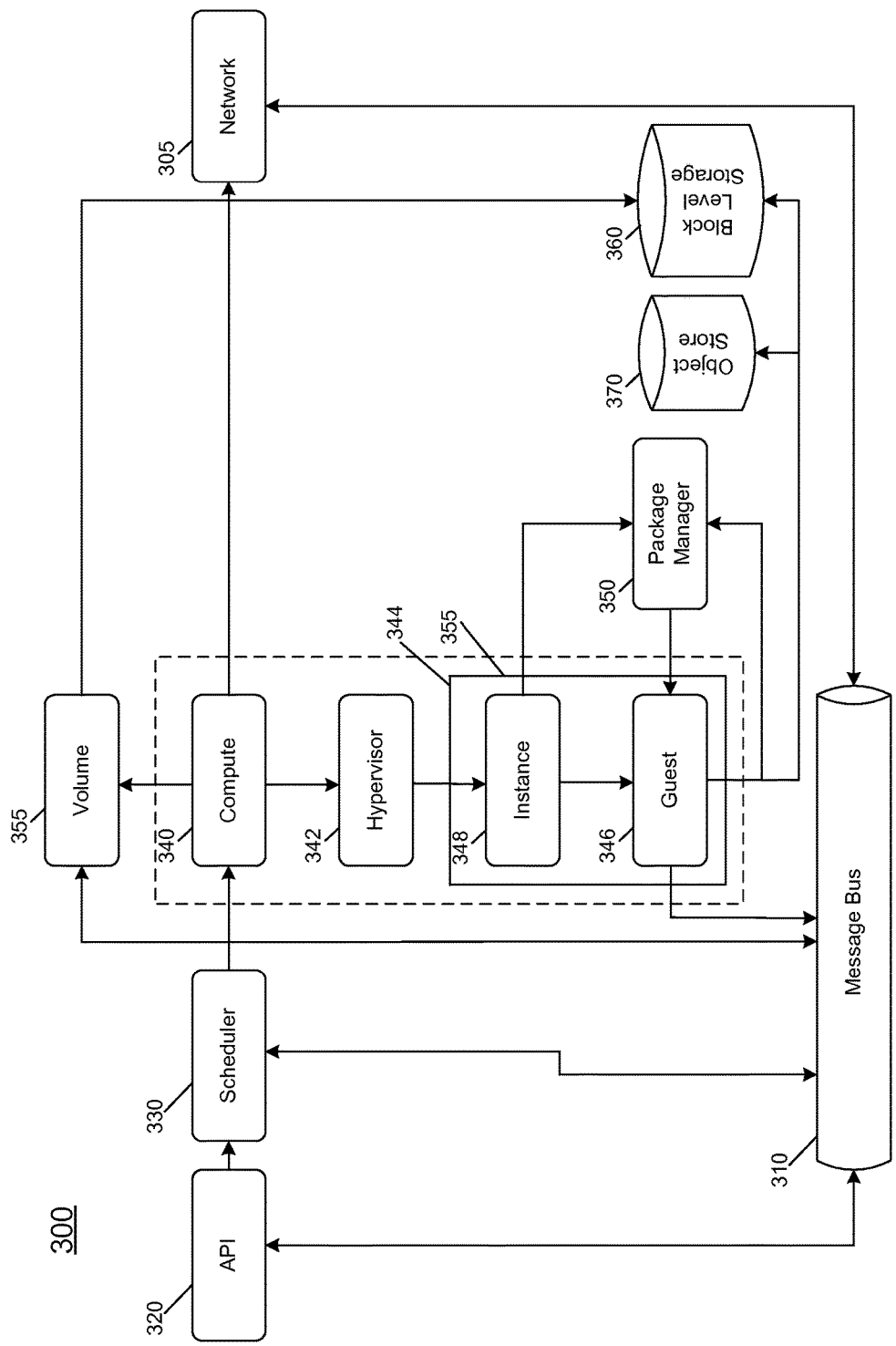
FIG. 5 is a block diagram illustrating interaction between various components used in a multi-tenant environment to handle a database as a service in accordance with one embodiment of the present invention.

Referring now to FIG. 5, shown is a block diagram illustrating interaction between various components used in a multi-tenant environment to provide database services. In the embodiment shown in FIG. 5, environment 300 can correspond to a portion of a multi-tenant datacenter that includes resources for use by multiple customers of the datacenter. Such resources can include computing resources, storage resources, routing resources, load balancer resources among many other such resource types. Note that in the datacenter environment, some of these resources can be dedicated resources, associated with a single customer, while others of the resources can be shared or cloud-based resources in which the resources can be dynamically allocated to customers. The resources also can be shared in the sense that multiple instances of a given resource, each associated with a given customer can be present in a single physical resource.

As seen in FIG. 5, datacenter environment 300 can include an application programming interface (API) 320 that receives incoming requests obtained from a network 305 via a message bus 310. Note that network 305 can be configured to receive requests from various customers via the Internet, and pass them through message bus 310 to API 320. In various embodiments, message bus 310 may be configured by registered components to identify queues from which they are to receive messages. In turn, API 320 can be of an open source cloud management system that receives incoming requests of different types and forwards them to appropriate destinations. For purposes of discussion and illustration herein, understand that the requests can all be database requests, either corresponding to a request to create a database, modify an attribute of a database such as seeking replication capability for the database, or to access a previously-created database, e.g., for purposes of storing data into the database or accessing and/or updating the data already present.

To this end, API 320 can be in communication with a scheduler 330 which may be a scheduler of the open source cloud-based environment. For purposes of discussion herein, scheduler 330 can be configured to receive database requests and provide them to an appropriate resource for handling. More specifically, scheduler 330 can allocate incoming database requests to a corresponding compute host or node 340. This allocation can be based on availability of resources on the computing host to handle the database instance. Note that a single such host is shown for ease of illustration. However as discussed above in given implementations many such hosts can be present. As seen, a compute host can include a hypervisor 342 that may act as supervisor layer and can be in communication with a container 344 that in turn can be configured with a database instance 348 along with a guest 346, which may include both a guest OS and a guest agent.

In general, during creation of a database instance within a container, guest 346 can communicate with a package manager 350 to request instantiation of the database instance. In addition to this database instance provided within a container, various setup operations to enable storage of data of the database instance in a network-based location can further be performed. Specifically, responsive to a database creation request, compute host 340 can create a volume 355 that can be provided in a block level storage 360, which in various embodiments can be a storage area network. In addition, an object store 370 may also be present. Object store 370 may store hypervisor guest images, from which these images can be retrieved, cached and used locally to create instances. Although shown with this particular configuration in the embodiment of FIG. 5, understand the scope of the present invention is not limited in this regard.

Figure 6:
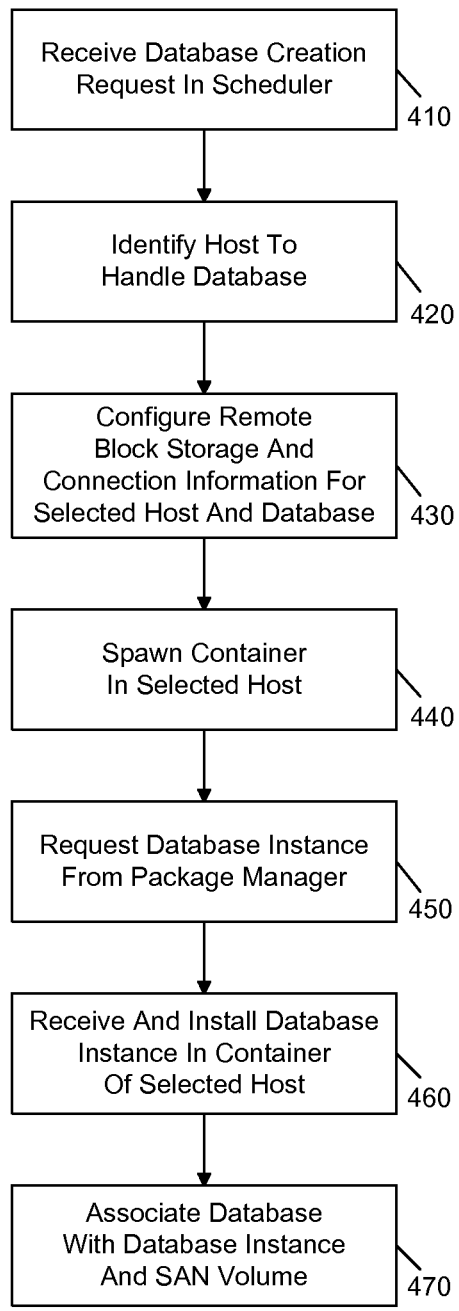
FIG. 6 is a flow diagram of a method of creating a database in a database as a service system in accordance with an embodiment of the present invention.

To understand how a database can be created in an environment such as that of FIG. 5, reference can be made to FIG. 6, which is a flow diagram of a method of creating a database in a database as a service system in accordance with an embodiment of the present invention. As shown in FIG. 6, method 400 can be performed by various logic within a multi-tenant datacenter environment that can handle incoming requests and assign them to resources of the datacenter environment appropriately. As seen, method 400 can begin by receiving a database creation request in a scheduler of the environment (block 410). Next, control passes to block 420 where the scheduler can identify a host to handle the requested database. Various scheduling algorithms can be used in this determination. For example, assume the request is from a customer having dedicated database resources such as dedicated cabinets including a local storage area network, resources can be allocated appropriately in this cabinet. Or for a cloud-based request, the scheduler can identify a cabinet by available computing (and storage) resources to handle the database. The identified host may be allocated an IP address, e.g., from a network layer of the environment.

When the identified computing host has been selected, control passes to block 430 where a remote block storage can be configured and connection information for the selected host and database can be allocated (block 430). This configuration of the remote block storage can be by identification of a volume within the block storage to be allocated to the database instance. This volume can be assigned a universally unique identifier (UUID) or a regular ID. In addition, to provide for communications between host and block storage, an appropriate identifier can be established, e.g., along with a password. In one embodiment, an iSCSI qualified name (IQN) can be provided at configuration time. Upon supply of this name, a two-way challenge handshake authentication policy (CHAP) password can be set up. Thus at this point this identification information can be used to access the database instance within the container, without the need for an IP or other global address.

At this point, a container in which to house the database instance can be spawned within the selected host, e.g., via the hypervisor (block 440). This spawning of the container includes a guest OS and a guest agent of the container. In turn, this guest can request a database instance from a package manager. This database instance as discussed above can be a database server such as a MySQL instance. Then at block 460 the host can receive and install the database instance within the container. Accordingly, a database as requested by the customer can be associated with the database instance and the SAN volume at block 470.

Note that all of the databases (which can be an unlimited number) within a given database instance are associated with a single volume on the SAN. In one embodiment, associating the database with the database instance and the SAN volume can include mounting a volume in /var/lib/mysql. In this way, it appears to the database instance that its operations with regard to storage are to a local mass storage device, rather than the remote block level storage. Thus the database is configured and ready for operation.

Figure 7:
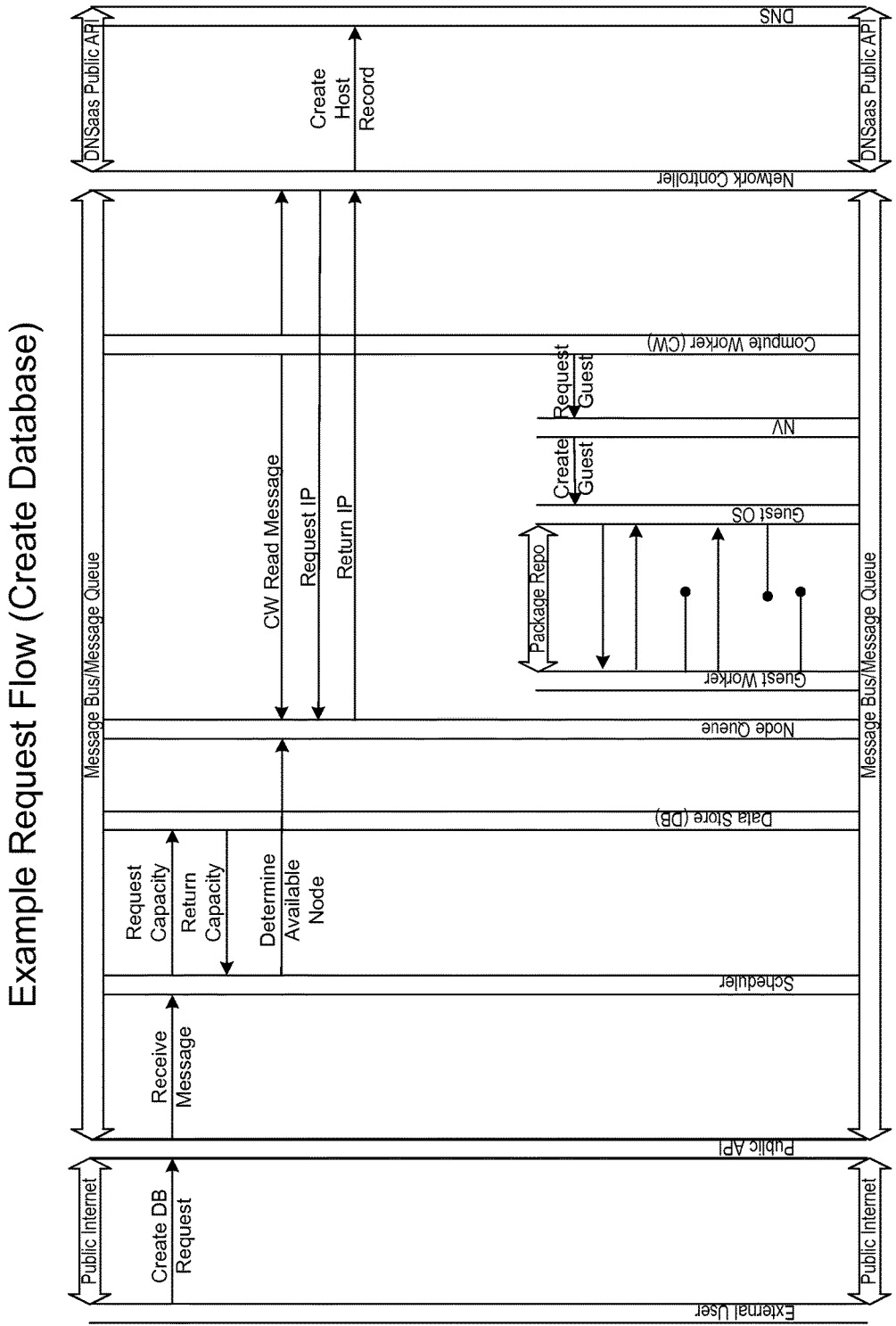
FIG. 7 is a flow diagram of operations performed in creating a database in a multi-tenant environment in accordance with an embodiment of the present invention.

To further illustrate provisioning of a database, reference can be made to FIG. 7, which is a flow of various communications in a datacenter environment to provision such a database. As seen, an incoming request from a user to create a database via a "create DB guest" request is received. Note that this user can be authenticated via validation of a token. Responsive to this request, a scheduler can find an available node to handle the database request. To this end, the scheduler can request capacity information from a data store, namely block storage 360 of FIG. 5. The data store can provide this information, and based at least in part on this information, the scheduler can determine an available node and pass a message with the request to create the database instance to a queue for this node.

Next, a compute worker, which may be a guest agent on the host node reads this message and sends a request to seek an IP address from a network component. In turn, the network component can generate this IP address, e.g., using information in the data store, and then provide the information to create a host record via a domain name system (DNS) server, which can be implemented as a DNSaaS, in one embodiment.

This IP address can be returned to the message queue so that the compute worker can request volume provisioning responsive to this verification that the IP address has been obtained. Accordingly, a volume can be provisioned and the compute worker can request, e.g., a hypervisor on the host to create a guest, which first installs a guest worker that can be obtained from a package repository. Note that this guest is created within a container within the identified host. A guest worker then calls the guest OS to request containing of a database instance from the package repository. When this instance is received, it can be installed. Thus the instance can be made available for handling database scenarios. This availability of the instance can be indicated to the requester via a verification message that the database instance is ready for operation. Although shown at this high level in the FIG. 7 implementation, understand the scope of the present invention is not limited in this regard. Furthermore, note that while these particular operations are shown with regard to creating a database instance, similar operations can be performed for other activities with regard to databases.

For example, similar requests and operations can be made to request replication of a database instance to thus provide for improved data security. Also, internal mechanisms within the datacenter environment can be used to programmatically enable operations such as moving a container including a multiple database instances (or all containers of a host) from one host machine to another while allowing the data of these database instances to persist, e.g., within the SAN.

Thus according to embodiments as described herein, great scalability of databases for multiple customers of a datacenter can be realized. These mechanisms can provide for automated programming of instances, including providing for replication of database instances, scaling database instances when the volume of data exceeds a threshold or so forth. Other actions can include memory scalability, migrations from machines that are heavily utilized to machines with less utilization, read slaves and so forth.

Embodiments may be implemented in code and may be stored on a storage medium having stored thereon instructions which can be used to program a system to perform the instructions. The storage medium may include, but is not limited to, any type of non-transitory storage medium suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
a plurality of physical server computers of a multi-tenant datacenter environment, each having a processor, a memory, a physical mass storage, and a hypervisor to provide a virtual environment and a plurality of containers each to directly communicate via a direct communication link with the physical mass storage of the physical server computer and to include a database instance and at least one database, wherein a container is to receive a database instance responsive to a request from a guest operating system (OS) within the container, the database instance instantiated from a database server image stored in an object store, the at least one database provided as a service, each of the plurality of containers isolated from others of the plurality of the containers and associated with a customer of the multi-tenant datacenter environment;
a storage area network (SAN) formed of a plurality of mass storage devices, the SAN of the multi-tenant datacenter environment and coupled to the plurality of physical server computers, wherein the SAN is to provide block level storage for databases provided as a service, each of the databases provided as a service to be in communication with a volume of the SAN; and
a scheduler to automatically identify one of the plurality of physical server computers to handle a database as a service request for a customer.

2. The system of claim 1, wherein the plurality of containers within a single physical server computer include database instances for multiple customers of the multi-tenant datacenter environment.

3. The system of claim 1, further comprising a first cabinet including a first plurality of physical server computers and a second cabinet including a second plurality of physical server computers, wherein the SAN is formed of block level storage present within the first and second cabinets.

4. The system of claim 3, wherein each physical server computer of the plurality of physical server computers includes a processor, a memory, and a disk storage corresponding to the physical mass storage.

5. The system of claim 3, wherein the first plurality of physical server computers and the second plurality of physical server computers comprise rack-mounted servers.

6. The system of claim 5, wherein the SAN comprises a top of rack SAN.

7. The system of claim 4, wherein the plurality of containers within each of the physical server computers are to communicate directly with the corresponding disk storage without a virtualization layer therebetween.

8. The system of claim 7, wherein the database instance comprises a MySQL server.

9. The system of claim 1, wherein the scheduler is to provision a container with a portion of the memory, and based on the provisioned portion of the memory, to further provision the container with a portion of processing power of the processor.

10. The system of claim 9, wherein the scheduler is to determine a priority grouping of the container with regard to the physical mass storage based on the provisioned portion of the memory.

11. A non-transitory article comprising instructions that enable a system to perform a method comprising:
receiving a database creation request from a user of a first customer of a cloud computing environment that includes a plurality of computing nodes each coupled to a storage area network (SAN);

selecting one of the plurality of computing nodes on which to create the database;

spawning a container including a guest operating system in the selected computing node;

requesting, via the guest operating system, a database instance from a repository coupled to the selected computing node, the repository comprising a package manager coupled to the plurality of computing nodes;

receiving the database instance from the repository; and installing the database instance in the container including a database server image obtained from an object store responsive to control by the package manager and creating the database in the container, including associating the database with the database instance and a volume of the SAN, the container isolated from other containers of the selected computing node to enable the database instance to be associated with the first customer.

12. The non-transitory article of claim 11, wherein selecting the computing node comprises identifying a computing node of the plurality of computing nodes that has sufficient resources to handle the database instance.

13. The non-transitory article of claim 11, wherein the method further comprises obtaining an IP address for the computing node from a domain name system (DNS) service.

14. The non-transitory article of claim 13, wherein the method further comprises obtaining an Internet Small Computer Systems Interface (iSCSI) qualified name (IQN) using the IP address.

15. The non-transitory article of claim 14, wherein the method further comprises requesting the volume within the SAN from a volume manager using the IQN.

16. A system comprising:

a plurality of physical server computers of a multi-tenant environment, each having a processor, a memory, a physical mass storage, and a hypervisor to provide a virtual environment for the physical server computer and a plurality of containers each to directly communicate via a direct communication link with the physical mass storage of the physical server computer and each including a database instance and at least one database and isolated from others of the plurality of containers and associated with a customer of the multi-tenant environment, the at least one database provided as a service;

a storage area network (SAN) formed of a plurality of mass storage devices, the SAN of the multi-tenant environment and coupled to the plurality of physical server computers, wherein the SAN is to provide block level storage for databases provided as a service, each of the databases provided as a service to be in communication with a volume of the SAN;

a package manager coupled to the plurality of physical server computers to receive a request to instantiate a database server in one of the plurality of physical server computers; and an object store to store a database server image and to enable the physical server computer to instantiate the database server from the database server image responsive to control by the package manager.

17. The system of claim 16, wherein a second one of the plurality of physical server computers is to be a slave database server for the requested database service.

18. The system of claim 16, wherein the plurality of containers within a single physical server computer include database instances for multiple customers of the multi-tenant environment.

19. The system of claim 16, further comprising a scheduler to provision a container of the plurality of containers with a portion of the memory, and based on the provisioned portion of the memory, to further provision the container with a portion of processing power of the processor.

20. The system of claim 19, wherein the scheduler is to determine a priority grouping of the container with regard to the physical mass storage based on the provisioned portion of the memory.

* * * * *